United States Patent
Farone et al.

(10) Patent No.: US 7,833,423 B2
(45) Date of Patent: Nov. 16, 2010

(54) ENHANCED OXIDATION PROCESS FOR REMOVAL OF WATER AND SOIL CONTAMINANTS

(75) Inventors: William A. Farone, Irvine, CA (US); Maryam H. Azad, Los Angeles, CA (US)

(73) Assignee: Regenesis Bioremediation Products, San Clemente, CA (US)

( * ) Notice: Subject to any disclaimer, the term of this patent is extended or adjusted under 35 U.S.C. 154(b) by 0 days.

(21) Appl. No.: 11/006,046

(22) Filed: Dec. 7, 2004

(65) Prior Publication Data

US 2005/0263460 A1 Dec. 1, 2005

Related U.S. Application Data

(60) Provisional application No. 60/575,957, filed on Jun. 1, 2004.

(51) Int. Cl.
*C02F 1/72* (2006.01)
*C02F 101/30* (2006.01)

(52) U.S. Cl. ............... 210/758; 210/763; 210/908; 210/909; 405/129.25

(58) Field of Classification Search .......... 210/763
See application file for complete search history.

(56) References Cited

U.S. PATENT DOCUMENTS

| 4,119,557 | A | | 10/1978 | Postlethwaite | |
|---|---|---|---|---|---|
| 4,743,381 | A | * | 5/1988 | Bull | 210/759 |
| 5,246,598 | A | * | 9/1993 | Proulx et al. | 210/759 |
| 5,620,610 | A | * | 4/1997 | Ishii et al. | 210/763 |
| 5,741,427 | A | * | 4/1998 | Watts et al. | 210/747 |
| 5,902,783 | A | | 5/1999 | Lagnemo | |
| 6,315,494 | B1 | | 11/2001 | Oberle | |
| 6,319,328 | B1 | * | 11/2001 | Greenberg et al. | 134/2 |
| 6,547,490 | B2 | | 4/2003 | Doetsch | |
| 6,663,781 | B1 | * | 12/2003 | Huling et al. | 210/668 |
| 6,866,788 | B1 | * | 3/2005 | Baig et al. | 210/758 |
| 6,872,261 | B2 | * | 3/2005 | Stengel | 134/10 |
| 2002/0002983 | A1 | | 1/2002 | Greenberg | |

OTHER PUBLICATIONS

Tracy Palmer Bench Scale Test Unpublished and Redacted, Jun. 2005.
William A Farone Production of Recalcitrant By-Products from Chemical Oxidation Battelle International Conference on Remediation of Chlorinated and Recalcitrant Compounds Unpublished Monterey May 2006.
Gould, Inorganic Reactions and Structures, 1955, pp. 76-78, Henry Holt & Co., New York.
Fieser & Fieser, Reagents for Organic Synthesis, 1967, pp. 472-476, 952-954, 1102, John Wiley & Sons, Inc., New York.

* cited by examiner

*Primary Examiner*—Peter A Hruskoci
(74) *Attorney, Agent, or Firm*—C H O'Donohue (57) ABSTRACT

The treatment of contaminated waters or soils by an oxidizing agent and a catalyst is described. The addition of silica as a catalyst to an oxidizing agent with or without an additional metal catalyst showed a greater remediation effect. Subsequent normal bacterial processes are unimpeded since the treatment process does not leave residual chemicals.

13 Claims, 7 Drawing Sheets

Chemical Oxidation of Toluene with Sodium Persulfate

Figure 1. Chemical Oxidation of Toluene with Permanganate

Figure 2. Chemical Oxidation of Toluene with Sodium Persulfate

Figure 3. Toluene Oxidation with Percarbonate

Figure 4  PCE Oxidation with Percarbonate

Figure 5 Xylene Oxidation by Sodium Percarbonate Formulation

Figure 6 Oxidation of MTBE by Sodium Percarbonate Formulation

Figure 7. Comparison of Sodium Silicate to Silica

ENHANCED OXIDATION PROCESS FOR REMOVAL OF WATER AND SOIL CONTAMINANTS

This application claims the benefit of U.S. Provisional Application No. 60/575,957, filed Jun. 1, 2004.

FIELD OF INVENTION

The present invention is directed towards a method of treating aquifers, ground water, waste streams, and soils contaminated with organic pollutants. More specifically, the invention relates to the area of treatment of contaminated waters or soils by an oxidizing agent and a catalyst. It was found that the use of certain forms of silica as the catalyst enhanced the activity of the oxidizing agent. Moreover, the use of silica with a metal catalyst and oxidizing agent exhibited even a greater remediation effect. Additionally the condition of the treated material is such that subsequent normal bacterial processes can occur unimpeded by residual chemicals from the treatment materials.

BACKGROUND OF INVENTION

The following description of the background of the invention is provided to aid in understanding the invention, but is not admitted to be, or to describe, prior art to the invention. All publications are incorporated by reference in their entirety.

Chemical oxidation of unwanted chemicals has been used for many decades. The use of oxidants such as chlorine bleach, hydrogen peroxide, potassium permanganate, potassium persulfate, sodium perborate and a host of other similar oxidizing chemicals dates from the 1800's. The science of chemical oxidation is similar to that of bleaching clothes. The two major differences between bleaching clothes and oxidizing undesirable chemicals are:
1) In bleaching clothes the oxidizing agent is applied at low concentration in hot water while in ground water treatment of chemicals, the concentrations of the oxidizing agent used are higher at the point of treatment and are in cold water.
2) In bleaching clothes the oxidants are selected so as not to impart color to the solution or to the clothes whereas in ground water remediation, discoloration of the soil is of lesser concern but the treated water color should not be affected.

For decades technology has been sought to improve the effectiveness of oxidizing agents. An example of one improvement is the use of metal catalysts to increase the oxidizing effects of oxidizing agents. For example, the use of iron as a catalyst is described in a 1955 text book (Edwin S. Gould, "Inorganic Reactions and Structure", Henry Holt and Company, 1955 pp. 76-78). The oxidative relationship between hydrogen peroxide permanganate and persulfate is also described.

Fieser and Fieser (Louis F. Fieser and Mary Fieser, "Reagents for Organic Synthesis", John Wiley and Sons, 1967 pp. 472-476, 952-954, 1102) describe the use of iron salts with peroxide to make the so-called Fenton's Reagent citing the original paper by Fenton in 1894. It was found that chelates of iron work as well or better than iron alone and that other metal salts may also work. The Fiesers also discussed the metal catalysis of persulfate. However it was found that the oxidation did not proceed to completion. That is, specific reaction sequences are described leading from one series of chemicals to another. Specifically it was not shown that the reactions, for example of hydrocarbons and carbohydrates, led to complete oxidation of the materials to carbon dioxide and water. The present day aim of oxidizing technology for removal of pollutants can be described as follows:
1) To proceed as far as possible toward complete removal of the substrate species;
2) To proceed as rapidly as possible; and
3) To use as little reagent as possible.

The concept of using minimal reagent while providing efficient oxidation is especially important in treating chemicals in ground water or soils by oxidation where it is not desirable to leave the oxidant in the water or in the ground and to minimize the concentration of non native chemical species.

The use of chelated metals, specifically iron with a hydrogen peroxide liberating salt such as sodium perborate or sodium percarbonate is disclosed in U.S. Pat. No. 4,119,557 as part of an overall detergent formulation. In this patent the chelating agent using iron was shown to be superior to other metals such as copper and cobalt.

Recent applications related to ground water have been published. Many of these pregrant publications do not discuss the common chemistry surrounding bleaching. For example, U.S. PreGrant Publication 20020002983 A1 discusses the addition of iron chelates to ground water under buffered conditions. The main claim is to the use of the reagent solution comprising iron chelate and a pH buffering agent. U.S. Pat. No. 6,315,494 B1 dealing with soil remediation by permanganate oxidation discloses the use of metal catalysts.

With regard to bleaching compositions, further technology has ensued in making various forms of particles to be added to detergent formulations either with or without catalysts. For example, U.S. Pat. No. 5,902,783 describes a bleaching agent which is based on a silicate core and contains a peroxy material such as sodium percarbonate and a metal chelating agent in an organic compound. These materials are described for washing use and are undesirable in groundwater remediation as the materials would add more organic materials to the water being treated. Furthermore, these particles are described as being useful for incorporation in a box of detergent powder. U.S. Pat. No. 6,547,490 B1 describes similar types of particles except these are silicone coated rather than the silicone acting as a core. Both the silicone products and the silicates are not silica. The silicones are considered to be ground water contaminats.

It is important to distinguish the purpose of chemical oxidation from the process where the release of oxygen is to cause biological remediation of ground water contaminants or contaminants in soils. In the case of biological remediation the purpose is to feed the bacteria oxygen slowly over time and allow them to metabolize the contaminant. Oxidizing agents such as described previously for the direct chemical oxidation of the contaminants would be injurious to the microbes and defeat the purpose of the subsequent aerobic metabolism. When using chemical oxidation the possibility exists that the oxidation is unlikely to be complete so that the aquifer or soil must be left in a condition where the residual microbes on the edges of the treatment zone can effectively metabolize the residual oxidized materials and reoccupy their ecological niche in the treatment zone.

SUMMARY OF INVENTION

The present invention is directed towards a method of treating aquifer, ground water, or soil contaminated with organic pollutants. In one aspect methods are described where the aquifer or other waters are contacted with an oxidizing agent and a catalyst where the catalyst is silica. Additional methods are described where soil is contacted with an oxidizing agent and a catalyst where the catalyst is silica.

In one aspect the size of the size is 70 to 400 mesh. A further aspect is a silica mesh size of 100 to 230. In a further aspect the silica has a surface area available for nitrogen adsorption of 150 to 300 meters square per gram.

There are provided methods where the aquifer, ground water, or soil is contacted with the catalyst and an oxidizing agent sequentially. In a further aspect the catalyst and oxidizing agent are premixed in a slurry and then the slurry contacted with the aquifer, ground water, or soil. In an additional aspect the ratio of silica to oxidizing agent is 1:1.

Also are provided methods where the oxidizing agent is independently selected from the group consisting of salts of percarbonate, persulfate, and permanganate. In an additional aspect the oxidizing agent is independently selected from the group consisting of solutions of percarbonate, persulfate, and permanganate.

In one aspect a second catalyst is added to the remediation oxidation process. In a further aspect the second catalyst is independently selected from the group consisting of iron, palladium, platinum, ruthenium, and zinc. In another aspect the catalyst, second catalyst, and oxidizing agent are premixed in a slurry and then the slurry is contacted with the aquifer, ground water, or soil.

Also are provided formulations for the described methods where the concentration of oxidizing agent is 40 to 80% and the concentration of a catalyst is 15 to 60%. In a further aspect the concentration of the oxidizing agent is 40-80%, the concentration of the catalyst is 15-60% and the concentration of a second catalyst is 0 to 5%. In an additional aspect the concentration of oxidizing agent is 40-80%, the concentration of first catalyst is 15-55% and the concentration of a second catalyst is 4 to 5%. In another aspect the concentration of percarbonate is 80%, the concentration of silica is 15% and the concentration of iron is 5%

In one aspect the silica catalyst provides a means for maintaining open pores in the soil. In an additional aspect maintaining open pores allows the oxidant to penetrate the soil system further allowing the oxidizing agent to more thoroughly contact the contaminant in the presence of silica.

DEFINITIONS

In accordance with the present invention and as used herein, the following terms are defined with the following meanings, unless explicitly stated otherwise.

The term "enhancing" refers to increasing or improving a specific property.

The term "administered simultaneously" refers to the administration of one composition at or near the same time in which another composition is administered. Preferably administration is within 30 minutes of one another.

The term "therapeutically effective amount" refers to an amount that has any beneficial effect in treating aquifer, soil, wastestream, river(s) and river water, well(s) and well water, and any body of water.

The term "biodegradable" has its normal and usual meaning and may also refer to compounds that are readily utilized or degraded by naturally occurring microorganisms.

The term "silica" refers to amphorous silica, solid silica gel, or to high silica zeolites containing at least 95% silica.

The term "xylene" refers to p-xylene.

The term "soil" refers to the loose material that covers the land surfaces of Earth and supports the growth of plants. In general, soil is an unconsolidated, or loose, combination of inorganic and organic materials. The inorganic components of soil are principally the products of rocks and minerals that have been gradually broken down by weather, chemical action, and other natural processes. The organic materials are composed of debris from plants and from the decomposition of the many tiny life forms that inhabit the soil. Soils comprise a mixture of inorganic and organic components: minerals, air, water, and plant and animal material. Mineral and organic particles generally compose roughly 50 to 70 percent of a soil's volume. The other 30 to 50 percent consists of pores—open areas of various shapes and sizes. Networks of pores hold water within the soil and also provide a means of water transport. Oxygen and other gases move through pore spaces in soil. Pores also provide room for the growth of plant roots.

The term "aquifer" refers to an underground bed or layer of earth, soil, gravel or porous stone that yields water and through which water usually flows.

The term 'organic pollutant' refers to but is not limited to chemicals on the Environmental Protection Agency lists of such chemicals as updated from time to time and chemicals for which remedial action is required when they are released into the environment.

The term 'silica surface area' refers to the silica surface area for nitrogen gas as measured by the Brunauer, Emmett and Teller (BET) technique, in which nitrogen is used to measure the total surface area of the particles.

The following well known chemicals are referred to in the specification and the claims. Other abbreviations used and names are provided.

DCE: dichloroethylene
Fe: iron (ferrous or ferric)
$KMnO_4$: potassium permanganate
PCE: tetrachloroethylene; perchloroethylene
MTBE: methyl tert-butyl ether
TCA: trichloroethane
BTEX: benzene, toluene, ethyl benzene and xylene

DETAILED DESCRIPTION OF INVENTION

Unexpectedly it was found that silica could be used to catalyze oxidation reactions to a surprisingly large extent. The effectiveness of sodium percarbonate, potassium persulfate and potassium permanganate were all improved utilizing silica as a catalyst, either with or without the use of iron catalyst. The silica gel can be added as a dry powder in a mixture with the oxidizing agent with or without a metal catalyst and the entire mixture injected into the treatment zone.

Silica gel in varying mesh sizes ranging from 70 to 400 were used in a weight ratio of about 1:1 with the oxidizing agent. The magnitude of the catalysis was extremely surprising considering that it is not clear that these reactions are surface mediated.

Since the purpose of metal catalysis is to generate free hydroxyl radicals when one uses peroxide under acid conditions and perhydroxyl radicals when one uses peroxide under basic conditions, it might be expected that increased surface area would capture and reduce the effectiveness of these short lived radicals. Unexpectedly it was found that silica increased the rate of the reactions due to catalysis. Silica gel may also increase the pH (more basic) in the vicinity of the particles, and it is generally held that acid conditions favor free hydroxyl radicals. Again it was found that the expected effect of silica on pH did not affect the rate of chemical oxidation.

Figure 1:
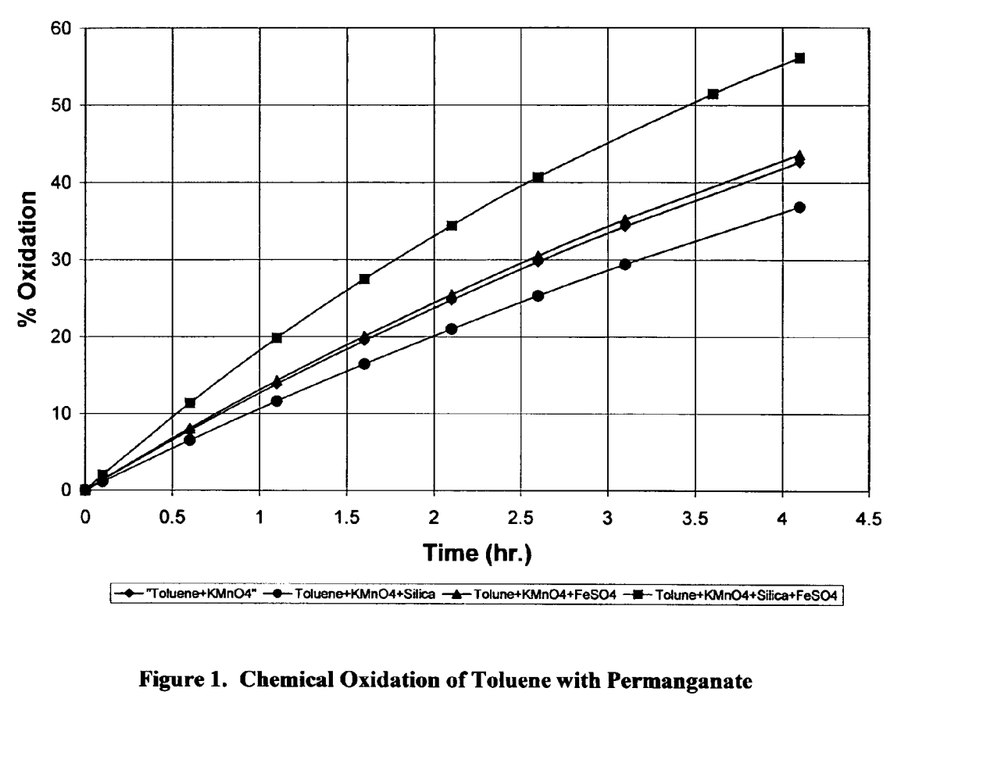
FIG. 1 The reduction of toluene in hours by oxidation with $KMnO_4$ solutions
Figure 2:
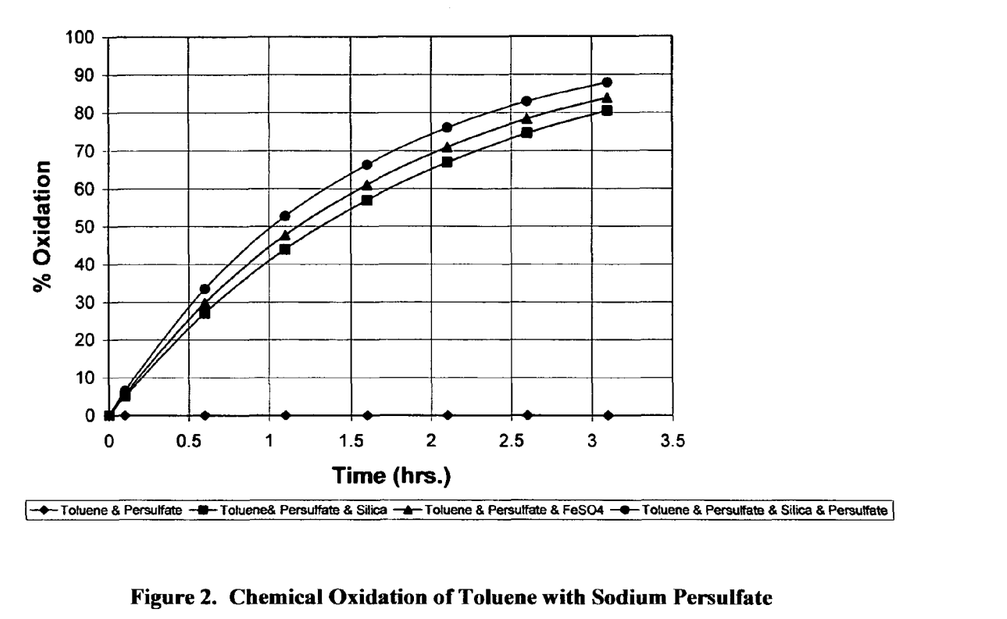
FIG. 2 The reduction of toluene in hours by oxidation with sodium persulfate solutions FIG. 3 The reduction of toluene in hours by oxidation with sodium percarbonate solutions FIG. 4 The reduction of PCE in hours by oxidation with sodium percarbonate solutions.
Figure 3:
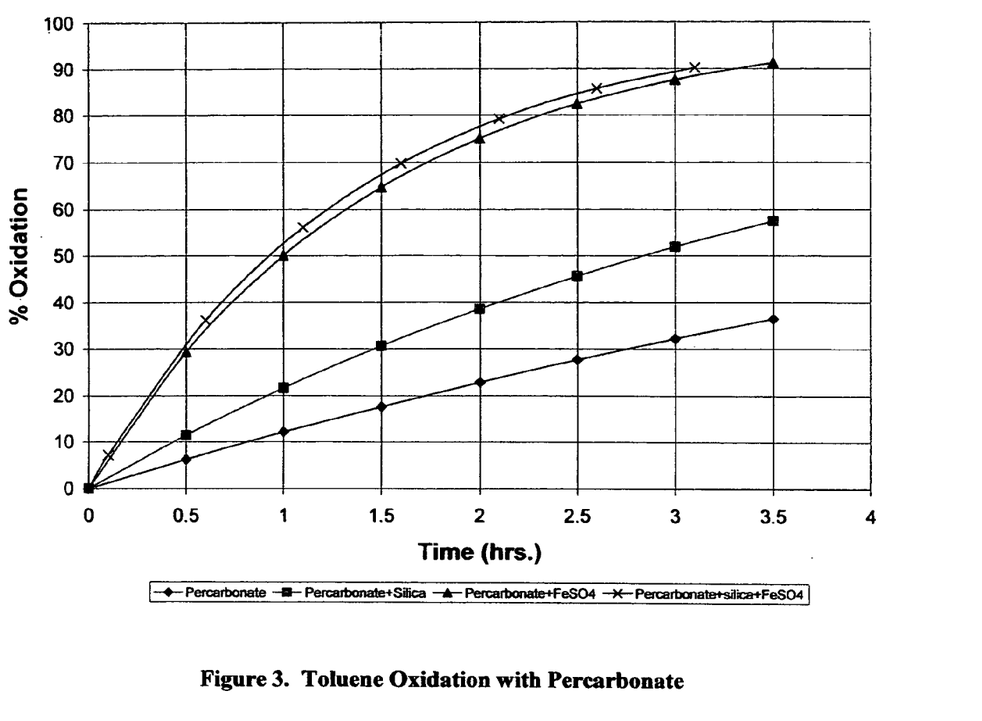

The results in FIGS. 1-3 show three different oxidizing agents used for the same concentration of toluene. Toluene was selected as a typical aromatic hydrocarbon (usually termed BTEX for benzene, toluene, ethyl benzene and xylene). The toluene concentration used was the saturation concentration of toluene in water. This typically would be the maximum amount found in water. For example in ground water or aquifers, if free toluene was present, the free toluene would dissolve into the water to maintain a saturated concentration of toluene as the original water concentration of toluene decreased with the oxidation of toluene. Thus the toluene in both the water and surrounding area would be oxidized to effectively remove the contaminant from the site. The Figures (FIGS. 1-3) show the results over the first 3-4 hours of treatment for each of three oxidants.

Figure 4:
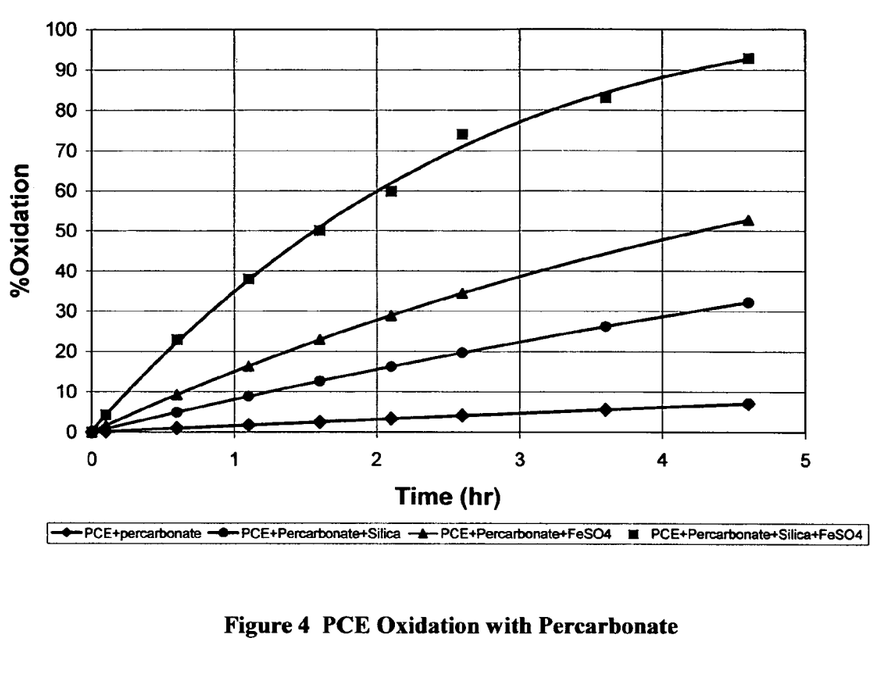

The results in FIG. 4 show four different sodium percarbonate oxidant formulations used for the oxidation of PCE.

Figure 5:
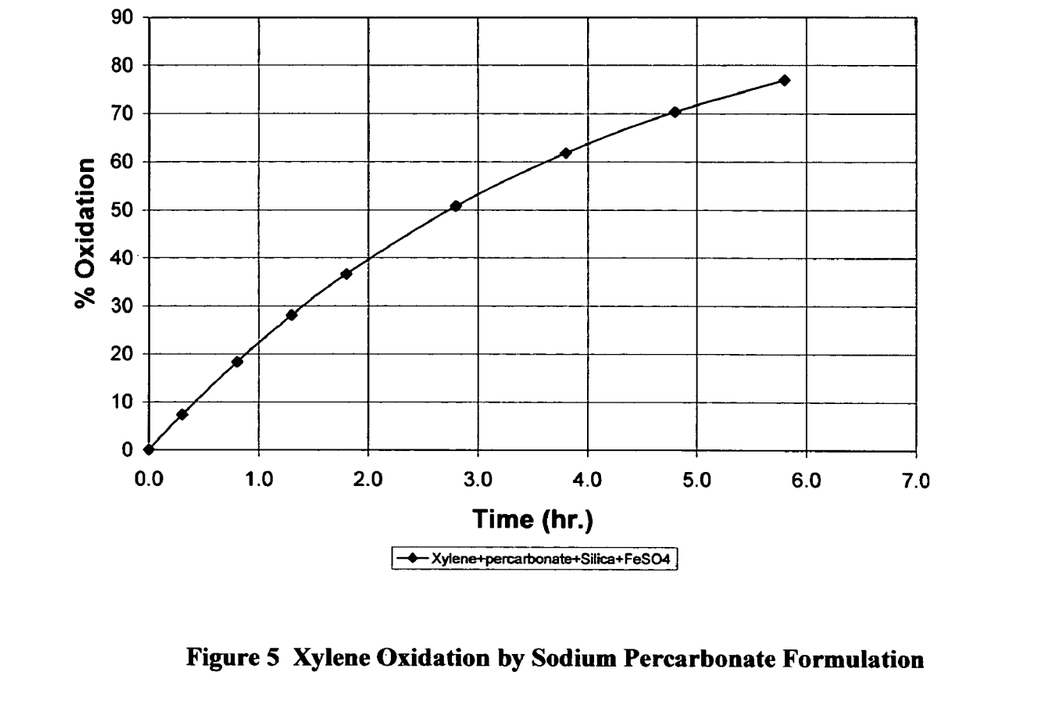
FIG. 5 The reduction of p-xylene in hours by oxidation with sodium percarbonate formulation.
Figure 6:
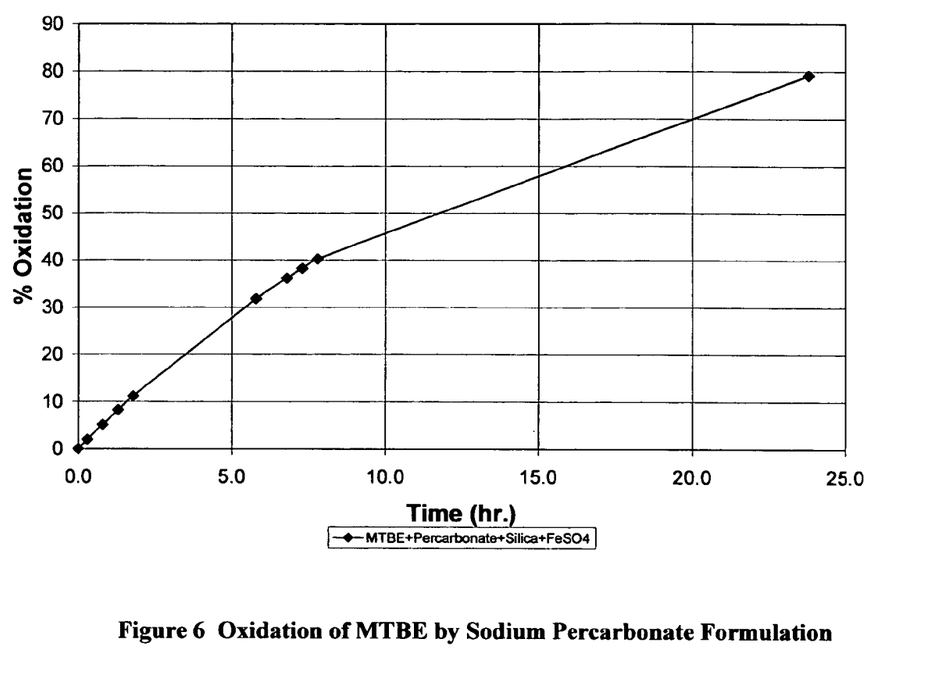
FIG. 6 The reduction of MTBE in hours by oxidation with sodium percarbonate formulation.

The results in FIGS. 5 and 6 show the use of percarbonate with silica and an iron catalyst for the oxidation of xylene and MTBE, respectively.

Not surprisingly there are varying degrees of oxidation between the oxidants. Unexpectedly it was found that including silica with the oxidants and the catalyst gave sufficiently improved oxidation of the pollutants over the use of the oxidant and a metal catalyst. The silica effect was seen above that of the catalyst alone. Furthermore, in every case, the use of silica alone catalyzed the reaction and in the case of permanganate and persulfate the resultant catalysis was equivalent to the use of iron as the only catalyst. In remediation cases where it was undesirable to leave high levels of iron or other metal in the aquifer, silica's use would permit pollution reduction without further harm to the environment. In all cases it was found that the use of silica would shorten the time or amount of material needed for a given reduction.

The efficacy of silica with a variety of oxidants on a wider range of chemicals has been demonstrated. The list of materials oxidized is presented in the following table (Table 1) along with the half life for each of the oxidation reactions. The half lives and the reaction rate constant are based on the experimental system used. The reaction typically behaves in a first order manner in the laboratory. Even if the reaction behaves slightly different in selected field conditions, the experimental developed reaction rate constant allowed the inventors a way of evaluating the efficacy on various chemicals. The experimental developed information reactions were shown in a field site oxidation of contaminants study given in Example I (Tables 2-4).

The experimental data presented in Table 1 were obtained from experiments as described in the Examples A-H that follow. In general, a solution of the contaminant was made up in 100 ml of water. The solution contained either (1) dissolved contaminant or (2) saturated with contaminant. Two equivalent solutions were made and the oxidant formula was added to one of the two solutions. The second solution was untreated with the oxidant formula and served as the control for that particular contaminant and oxidant formula. Contaminant concentrations in both solutions (treated and untreated) were measured over time by gas chromatography. The reduction of the contaminant in the test solution was compared versus the concentration of the contaminant in the control. The methodology used accounted for the potential loss of contaminant by off-gassing from the control solution.

In one aspect the following range of formulations were used:

| | |
|---|---|
| Sodium percarbonate (or other oxidant) | 40-80% |
| Silica (or equivalent $SiO_2$ amount of silicate) | 15-60% |
| Ferrous salt (equivalent $Fe^{+2}$ as sulfate) | 0-5% |

In an additional aspect the higher rates of oxidation as measured occurred with the following formulations:

| | |
|---|---|
| Sodium percarbonate (or other oxidant) | 40-80% |
| Silica (or equivalent $SiO_2$ amount of silicate) | 15-55% |
| Ferrous salt (equivalent $Fe^{+2}$ as sulfate) | 4-5% |

In a further aspect another formulation as given below was used:

| | |
|---|---|
| Sodium percarbonate (or other oxidant) | 47.6% |
| Silica (or equivalent $SiO_2$ amount of silicate) | 47.6% |
| Ferrous salt (equivalent $Fe^{+2}$ as sulfate) | 4.8% |

In another aspect a further formulation as given below was used:

| | |
|---|---|
| Sodium percarbonate (or other oxidant) | 80.0% |
| Silica (or equivalent $SiO_2$ amount of silicate) | 15% |
| Ferrous salt (equivalent $Fe^{+2}$ as sulfate) | 5% |

The formulation will change depending on the geochemistry of the site's geochemistry. For example, a site high in organic materials other than the contaminant may require a higher oxidant to silica ratio.

Figure 7:
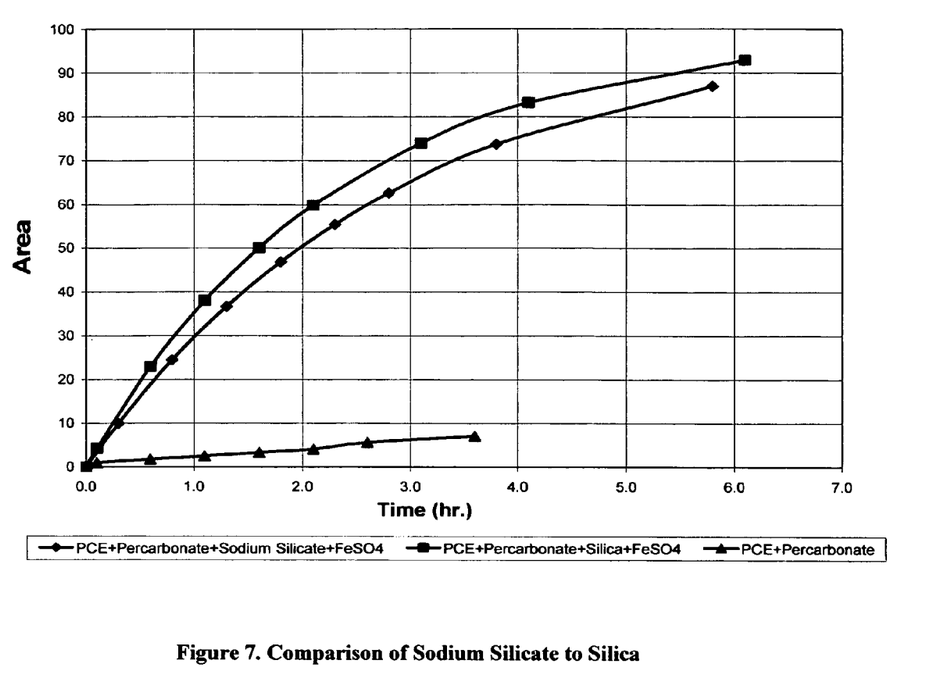
FIG. 7 Comparison of sodium silicate versus silica in the reduction of PCE.

It was found that making a premixed slurry of sodium silicate and water gave equivalent results in the half life of the contaminant along with an equivalent rate constant (Table 1). It was found that using a slurry that was partially sodium silicate gave a stable slurry. As the pH dropped the sodium silicate present in the slurry turned to silica. The results in FIG. 7 show that using of sodium silicate/percarbonate/iron versus using silica/percarbonate/iron formula gave equivalent results.

TABLE 1

Chemical Tested With Oxidant Formulation

| Treatment | Chemical Oxidized | half life hours | rate constant /hour |
|---|---|---|---|
| percarbonate + silica + iron | toluene | 0.8 | 0.866 |
| percarbonate + iron | toluene | 1 | 0.693 |
| percarbonate + silica | toluene | 2.8 | 0.248 |

TABLE 1-continued

Chemical Tested With Oxidant Formulation

| Treatment | Chemical Oxidized | half life hours | rate constant /hour |
|---|---|---|---|
| percarbonate | toluene | 7 | 0.099 |
| persulfate + silica + iron | toluene | 1 | 0.693 |
| persulfate + iron | toluene | 1.25 | 0.555 |
| persulfate + silica | toluene | 1.5 | 0.462 |
| persulfate | toluene | infinite | 0 |
| permanganate + silica + iron | toluene | 3 | 0.231 |
| permanganate + iron | toluene | 7 | 0.099 |
| permanganate + silica | toluene | 7.5 | 0.092 |
| permanganate | toluene | 7 | 0.099 |
| percarbonate + silica + iron | PCE | 1 | 0.693 |
| percarbonate + iron | PCE | 4 | 0.173 |
| percarbonate + silica | PCE | 9 | 0.077 |
| percarbonate | PCE | 30 | 0.023 |
| percarbonate + silica + iron | PCE | 1.5 | 0.462 |
| percarbonate + Na silicate + iron | PCE | 1.9 | 0.365 |
| persulfate + silica + iron | PCE | 1.2 | 0.578 |
| persulfate + iron | PCE | 2.3 | 0.301 |
| persulfate + silica | PCE | 4.6 | 0.151 |
| persulfate | PCE | 30 | 0.023 |
| permanganate + silica + iron | PCE | 1.75 | 0.396 |
| permanganate + iron | PCE | 5 | 0.139 |
| permanganate + silica | PCE | 0.6 | 1.155 |
| permanganate | PCE | 0.9 | 0.770 |
| percarbonate + silica + iron | TCA | 6 | 0.116 |
| percarbonate + silica + iron | xylene | 2.6 | 0.267 |
| percarbonate + silica + iron | phenanthrene | 2.7 | 0.257 |
| percarbonate + silica + iron | naphthalene | 13 | 0.053 |
| percarbonate + silica + iron | MTBE | 10.5 | 0.066 |
| percarbonate + silica + iron | ethylbenzene | 7.5 | 0.092 |
| percarbonate + silica + iron | DCE | 1.2 | 0.578 |
| percarbonate + silica + iron | benzene | 16 | 0.043 |
| percarbonate + silica + iron | octane | 5.5 | 0.126 |
| persulfate | octane | 10.5 | 0.066 |
| permanganate | octane | 13 | 0.053 |

EXAMPLES

Example A

Oxidation of Toluene by Potassium Permanganate

Solutions containing equal concentration of toluene (500 ppm) were made up in 100 ml of water. One of the four oxidant formula was added to one of the solutions. The four oxidant formulations used were: (a) potassium permanganate (3 g); (b) potassium permanganate (3 g) and silica (3 g), (c) potassium permanganate (3 g), ferrous sulfate (0.3 g).and (d) potassium permanganate (3 g), silica (3 g) and ferrous sulfate (0.3 g). The second solution was untreated and served as the control for the solutions treated by oxidant formulation, a, b, c, or d. Concentration of toluene in both solutions (treated solution and untreated control) was measured over time by gas chromatography. The reduction of the toluene concentration in the test solution was compared versus the concentration of the toluene in the control. The methodology used accounted for the potential loss of toluene by off-gassing from the control toluene solution.

Example B

Oxidation of Toluene by Sodium Persulfate

Solutions containing equal concentration of toluene (500 ppm) were made up in 100 ml of water. One of the four oxidant formula was added to one of the solutions. The four oxidant formulations used were: (a) sodium persulfate (3 g); (b) sodium persulfate (3 g) and silica (3 g), (c) sodium persulfate (3 g), ferrous sulfate (0.3 g).and (d) sodium persulfate (3 g), silica (3 g) and ferrous sulfate (0.3 g). The second solution was untreated and served as the control for the solutions treated by oxidant formulation, a, b, c, or d. Concentration of toluene in both solutions (treated solution and untreated control) was measured over time by gas chromatography. The reduction of the toluene concentration in the test solution was compared versus the concentration of the toluene in the control. The methodology used accounted for the potential loss of toluene by off-gassing from the control toluene solution.

Example C

Oxidation of Toluene by Sodium Percarbonate

Solutions containing equal concentration of toluene (500 ppm) were made up in 100 ml of water. One of the four oxidant formula was added to one of the solutions. The four oxidant formulations used were: (a) sodium percarbonate (3 g); (b) sodium percarbonate (3 g) and silica (3 g), (c) sodium percarbonate (3 g), ferrous sulfate (0.3 g).and (d) sodium percarbonate (3 g), silica (3 g) and ferrous sulfate (0.3 g). The second solution was untreated and served as the control for the solutions treated by oxidant formulation, a, b, c, or d. Concentration of toluene in both solutions (treated solution and untreated control) was measured over time by gas chromatography. The reduction of the toluene concentration in the test solution was compared versus the concentration of the toluene in the control. The methodology used accounted for the potential loss of toluene by off-gassing from the control toluene solution.

Example D

Oxidation of PCE by Potassium Permanganate

Solutions containing equal concentration of PCE (500 ppm) were made up in 100 ml of water. One of the four oxidant formula was added to one of the solutions. The four oxidant formulations used were: (a) potassium permanganate (3 g); (b) potassium permanganate (3 g) and silica (3 g), (c) potassium permanganate (3 g), ferrous sulfate (0.3 g).and (d) potassium permanganate (3 g), silica (3 g) and ferrous sulfate (0.3 g). The second solution was untreated and served as the control for the solutions treated by oxidant formulation, a, b, c, or d. Concentration of PCE in both solutions (treated solution and untreated control) was measured over time by gas chromatography. The reduction of the PCE concentration in the test solution was compared versus the concentration of the PCE in the control. The methodology used accounted for the potential loss of the contaminant by off-gassing from the control solution.

Example E

Oxidation of PCE by Sodium Persulfate

Solutions containing equal concentration of PCE (500 ppm) were made up in 100 ml of water. One of the four oxidant formula was added to one of the solutions. The four oxidant formulations used were: (a) sodium persulfate (3 g); (b) sodium persulfate (3 g) and silica (3 g), (c) sodium persulfate (3 g), ferrous sulfate (0.3 g).and (d) sodium persulfate (3 g), silica (3 g) and ferrous sulfate (0.3 g). The second solution was untreated and served as the control for the solutions treated by oxidant formulation, a, b, c, or d. Concentration of PCE in both solutions (treated solution and untreated control) was measured over time by gas chromatography. The reduction of the PCE in the test solution was compared versus the concentration of the PCE in the control. The methodology used accounted for the potential loss of the contaminant by off-gassing from the control solution.

Example F

Oxidation of PCE by Sodium Percarbonate

Solutions containing equal concentration of PCE (500 ppm) were made up in 100 ml of water. One of the four oxidant formula was added to one of the solutions. The four oxidant formulations used were: (a) sodium percarbonate (3 g); (b) sodium percarbonate (3 g) and silica (3 g), (c) sodium percarbonate (3 g), ferrous sulfate (0.3 g).and (d) sodium percarbonate (3 g), silica (3 g) and ferrous sulfate (0.3 g). The second solution was untreated and served as the control for the solutions treated by oxidant formulation, a, b, c, or d. Concentration of PCE in both solutions (treated solution and untreated control) was measured over time by gas chromatography. The reduction of the PCE in the test solution was compared versus the concentration of the PCE in the control. The methodology used accounted for the potential loss of the contaminant by off-gassing from the control solution.

Example G

Oxidation of Xylene by Sodium Percarbonate

Solutions containing equal concentration of xylene (180 ppm) were made up in 100 ml of water. Oxidant formula consisting of sodium percarbonate (3 g), silica (3 g) and ferrous sulfate (0.3 g) was added to one of the solutions. A second solution was untreated and served as the control for the solution treated by oxidant formulation. Concentration of xylene in both solutions (treated solution and untreated control) was measured over time by gas chromatography. The reduction in concentration of the xylene in the test solution was compared versus the concentration of the xylene in the control. The methodology used accounted for the potential loss of the contaminant by off-gassing from the control solution.

Example H

Oxidation of MTBE by Sodium Percarbonate

Solutions containing equal concentration of MTBE (5500 ppm) were made up in 100 ml of water. Oxidant formula consisting of sodium percarbonate (3 g), silica (3 g) and ferrous sulfate (0.3 g) was added to one of the solutions. A second solution was untreated and served as the control for the solution treated by oxidant formulation. Concentration of MTBE in both solutions (treated solution and treated control) were measured over time by gas chromatography. The reduction of the MTBE concentration in the test solution was compared versus the concentration of the MTBE in the control. The methodology used accounted for the potential loss of the contaminant by off-gassing from the control solution.

Example I

Field Site Oxidation of Contaminants

At a field site that was 30×20 feet at the surface and 15 to 17 feet deep (approximately 10,000 $ft^3$), a formulation containing 475 pounds of sodium percarbonate (88%), 50 pounds of silica (9.3%) and 15 pounds of ferrous sulfate (2.7%) was injected after the materials were mixed in water. The contaminants at the site were benzene, ethylbenzene, toluene, xylene (meta/para and ortho), naphthalene, 1,2,4-trimethyl benzene and 1,3,5-trimethylbenzene. The formulation was injected in three separate wells and the results of the oxidation measured at each well over a period of one week after the injection.

The results for each well are given respectively in Tables 2-4.

TABLE 2

| Values at Well 1 (µg/L) | | | |
|---|---|---|---|
| Chemical | Peak Value | Final Value | Half life (hrs) |
| Benzene | 184 | 21 | 46 |
| Ethylbenzene | 381 | 7 | 25 |
| Toluene | 174 | 14 | 40 |
| Xylene (m,p) | 440 | 90 | 63 |
| Xylene (o) | 83 | 43 | 152 |
| Naphthalene | 91 | 43 | 132 |
| 1,2,4-Trimethylbenzene | 236 | 5 | 28 |
| 1,3,5-Trimethylbenzene | 128 | 115 | 374 |

Peak value is highest concentration measured during test
Final value is the concentration at the end of one week.

TABLE 3

| Values at Well 2 (µg/L) | | | |
|---|---|---|---|
| Chemical | Peak Value | Final Value | Half life (hrs) |
| Benzene | 174 | 6 | 52 |
| Ethylbenzene | 543 | 37 | 52 |
| Toluene | 57 | 2 | 52 |
| Xylene (m,p) | 420 | 35 | 51 |
| Xylene (o) | 85 | 4 | 49 |
| Naphthalene | 130 | 12 | 54 |
| 1,2,4-Trimethylbenzene | 258 | 22 | 49 |
| 1,3,5-Trimethylbenzene | 159 | 16 | 57 |

Peak value is highest concentration measured during test
Final value is the concentration at the end of one week.

TABLE 4

| Values at Well 3 (µg/L) | | | |
|---|---|---|---|
| Chemical | Peak Value | Final Value | Half life (hrs) |
| Benzene | 67 | <1 | 24 |
| Ethylbenzene | 166 | 7 | 31 |
| Toluene | 28 | 1 | 32 |
| Xylene (m,p) | 195 | 10 | 33 |
| Xylene (o) | 31 | 4 | 49 |
| Naphthalene | 25 | 5 | 60 |
| 1,2,4-Trimethylbenzene | 128 | 3 | 29 |
| 1,3,5-Trimethylbenzene | 57 | 14 | 69 |

Peak value is highest concentration measured during test

Final value is the concentration at the end of one week.

The wells were monitored at the beginning and then four times during the test. The peak values of contaminants in the wells did not occur at the beginning of the test due to the movement of water and contaminants in field sites. The tables report the peak value that occurred during the period of the test and the value that was measured at the end of one week.

The half lives that are given in the tables are calculated from the time between readings using readings that showed a decrease between periods and assuming first order kinetics. This calculation is imprecise in field situation as a result of influx of material at the various wells. The half life values, however, are expected to be longer than in systems without packed soil due to the restricted movement of the oxidant and contaminant allowing fewer collisions per unit time in packed soil. In packed soils the solids obscure approximately 75% of the space in a three dimensional volume. Thus, molecules only have 25% of the space to move within compared to a solution and are more likely to hit soil than they are other molecules that are involved in the h reaction. Reactions take place when molecules collide so the rate of any reaction is related to the number of collisions that will occur per unit time. In the absence of other effects, therefore, one would expect that the rate would be some 3-4 times slower in soil because there are 3-4 times fewer collisions between the molecules involved in the reaction. The values are relatively consistent and provide validation for similar reactions occurring throughout the treatment zone.

We claim:

1. A method of treating aquifer or ground water contaminated with organic pollutants wherein said organic pollutants are selected from the group consisting of aromatic hydrocarbons, toluene, benzene, ethyl benzene, xylene, tetrachloroethylene, trichloroethane, phenanthrene, naphthalene, methyl tert-butyl ether, octane, 1,2,4-trimethylbenzene, and 1,3,5-trimethylbenzene comprising:
   a) contacting said aquifer with a formulation comprising an oxidizing agent wherein the oxidizing agent is independently selected from the group consisting of sodium percarbonate, sodium persulfate, potassium persulfate, sodium permanganate, and potassium permanganate; and a catalyst wherein the catalyst is silica;
   b) combining said oxidizing agent at a concentration of about 40 to 80% and said catalyst at a concentration of about 15 to 60%; and
   c) adding said formulation to said aquifer in amount sufficient to substantially remove said pollutants.

2. The method of claim 1 wherein the silica size is 70 to 400 mesh.

3. The method of claim 2 wherein the silica size is from 100 to 230 mesh.

4. The method of claim 1 wherein said silica surface area is 150 to 300 meters square per gram.

5. The method of claim 1 wherein said aquifer is contacted with said catalyst and said oxidizing agent sequentially.

6. The method of claim 1 wherein said aquifer is contacted with a premixed slurry of said catalyst and said oxidizing agent.

7. The method of claim 1 wherein the ratio of silica to oxidizing agent is 1:1.

8. The method of claim 1 wherein a second catalyst is added to remediation process.

9. The method of claim 8 wherein said second catalyst is independently selected from the group consisting of iron, palladium, platinum, ruthenium, and zinc.

10. The method of claim 8 wherein concentration of said oxidizing agent is 40-80%, concentration of said catalyst is 15-60% and concentration of said second catalyst is greater than 0% to 5%.

11. The method of claim 10 wherein concentration of said oxidizing agent is 40-80%, concentration of said catalyst is 15-55% and concentration of said second catalyst is 4 to 5%.

12. The method of claim 11 wherein said oxidizing agent is percarbonate, said catalyst is silica, and said second catalyst is iron; and
    wherein concentration of said percarbonate is 80%;
    concentration of silica is 15%; and
    concentration of iron is 5%.

13. The method of claim 10 wherein combined concentration of said second catalyst and measured concentration of iron in aquifer or ground water is greater than 0% to about 5%.

* * * * *